April 8, 1969     H. L. CARPENTER, JR     3,437,231

PRECISION THREADED INSERT FOR PLASTIC CONTAINERS

Filed Aug. 17, 1967

INVENTOR
HERBERT L. CARPENTER, JR.
BY
ATTORNEYS

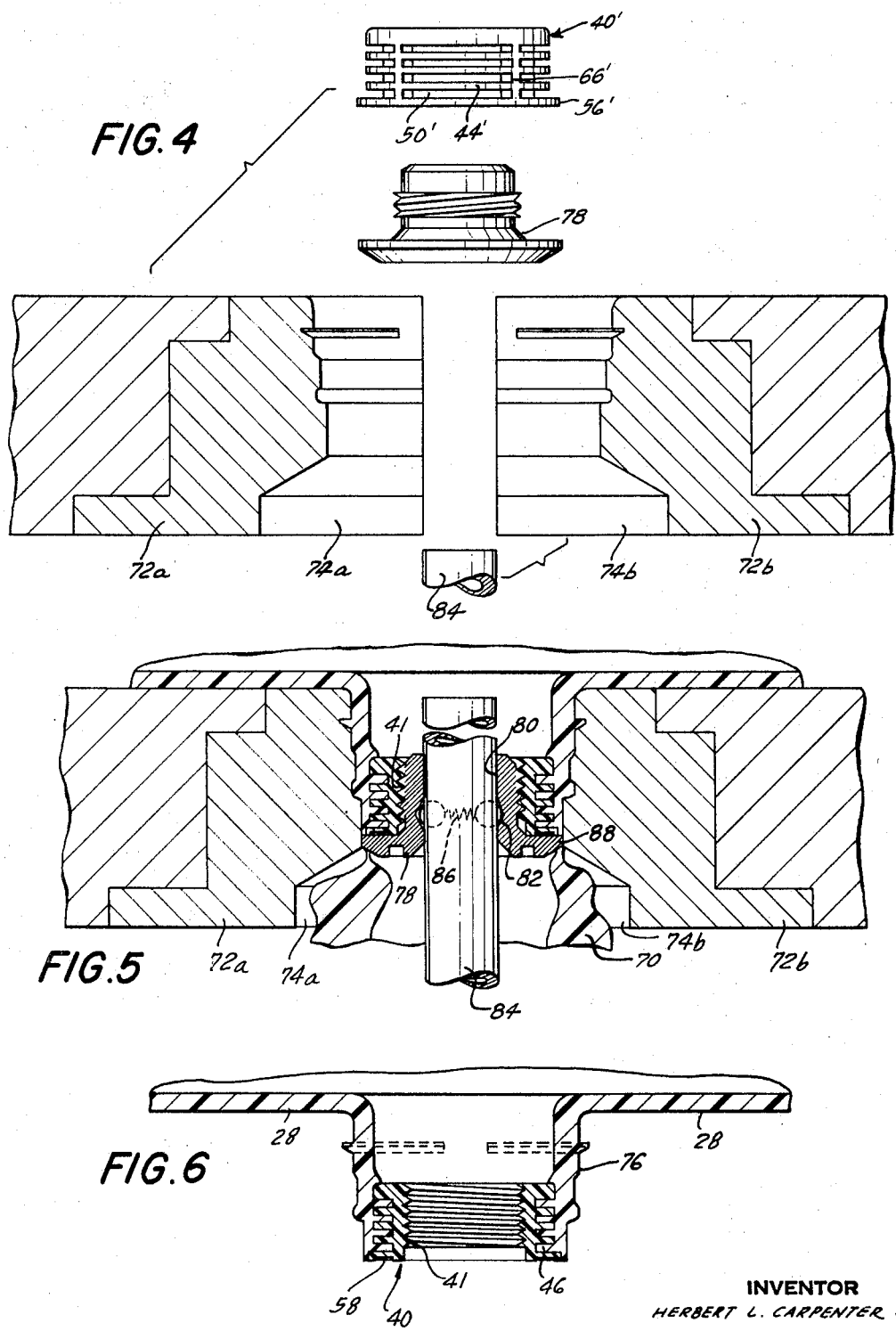

April 8, 1969 H. L. CARPENTER, JR 3,437,231

PRECISION THREADED INSERT FOR PLASTIC CONTAINERS

Filed Aug. 17, 1967 Sheet 3 of 3

INVENTOR
HERBERT L. CARPENTER JR.
BY
ATTORNEYS

United States Patent Office 3,437,231
Patented Apr. 8, 1969

3,437,231
PRECISION THREADED INSERT FOR
PLASTIC CONTAINERS
Herbert L. Carpenter, Jr., Babylon, N.Y., assignor to The
Greif Bros. Cooperage Corporation, Delaware, Ohio,
a corporation of Delaware
Filed Aug. 17, 1967, Ser. No. 661,453
Int. Cl. B65d 25/14, 41/04
U.S. Cl. 220—63                              12 Claims

ABSTRACT OF THE DISCLOSURE

A blow-molded drum body member having side walls with top and bottom portions affixed thereto and a neck extending outwardly from the top defining an opening into the drum interior. A precisely threaded bushing is disposed within the neck and coupled thereto in sealing engagement so that the internally threaded surfaces of the bushing define the passageway through the neck into the drum interior. The outer surface of the bushing is provided with a multiplicity of spaced annular flanges intersected by spaced vertical ribs which serve to prevent rotation of the bushing with respect to the neck. And, the method of affixing the bushing to the drum neck.

Background of the invention

Blow-molded plastic drum body members such as drum outer bodies and drum liners are being utilized in ever increasing numbers for shipping and storage purposes. Drums of this type are desirable because they are inexpensive and lightweight and also because of the numerous inherent advantages and characteristics of the plastic materials used in their manufacture, such as imperviousness and chemical inertness.

The blow-molded drum or drum liner is usually provided with a pouring neck and vent neck which define openings into the drum interior. The necks extend outwardly from the top surfaces of the drum top and may be provided with closures which threadedly engage the neck to seal the opening into the container when the container is not in use. Because of the nature of the blow molding procedure, great difficulty has been encountered in molding a container neck having precision threads which can insure a liquid type seal between the closure and neck. Since such plastic drums are often used to contain perfume extracts and other similar extremely valuable substances, any small amount of leakage is most undesirable and can result in costly loss. The relatively precise threads which are required to effectuate an adequate seal between the container and closure cannot be obtained by ordinary blow molding techniques and the use of elaborate blow molding techniques which can produce such threads would increase the cost of the drum and hence negate one of the most attractive features of such drums.

Summary of the invention

It is therefore a principal object of the present invention to provide a plastic drum body member having a neck which includes precision threads thereon so as to enable a cap to be tightly secured to the drum.

A further object is to provide a method of economically manufacturing such drums with standard blow molding equipment and requiring a minimum of modification.

These and other objects and advantages are most effectively attained by providing a drum which includes a plastic body member having side walls, a top and bottom and a neck extending outwardly from the top and defining an opening into the drum interior with a threaded insert in the form of a bushing. The inner surfaces of the bushing have disposed thereabout a precision thread and the outer surfaces of the bushing are adapted to engage with the inner surface of the neck in a liquid tight sealing relationship so that the inner surfaces of the bushing define the only passageway into the drum interior. The outer surface of the bushing is provided with means for preventing the rotation of the bushing relative to the neck when a closure is threadedly engaged therewith for purposes of sealing the drum. The rotation prevention means includes at least one member extending outwardly from the outer surface of the bushing having portions abutting against correspondingly protruding portions of the neck, thereby preventing the movement of the bushing relative to the neck.

One method of securing the bushing to the neck is to blow-mold the drum about a plastic bushing and while the plastic material comprising the neck is still in a liquid or semi-liquid state, to force it into intimate contact with the bushing thereby causing coalescence between the neck and bushing.

Description of the drawings

In the accompanying drawings:

FIG. 4 is a fragmentary exploded side elevational sectional view of the portion of a blow molding apparatus used to form the neck of the drum body member in accordance with the present invention prior to the introduction of the parison;

FIG. 5 is a fragmentary side elevational sectional view similar to FIG. 4 depicting the method of positioning and securing the bushing as the neck is formed;

FIG. 6 is a fragmentary side elevational sectional view of the neck of a drum body member;

Description of the preferred embodiment

Figure 1:
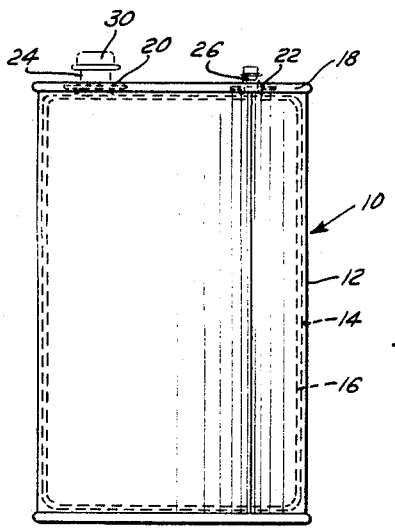
FIG. 1 is a side elevational view of a container provided with a threaded insert in accordance with the present invention.
Figure 2:
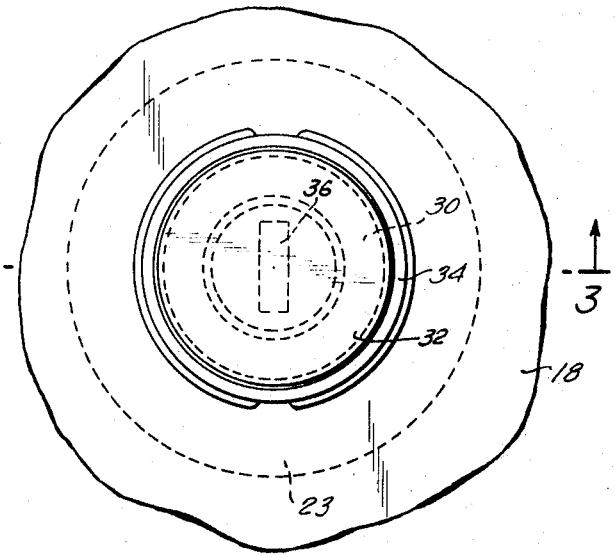
FIG. 2 is an enlarged fragmentary top plan view of the neck of the container of FIG. 1.
Figure 3:
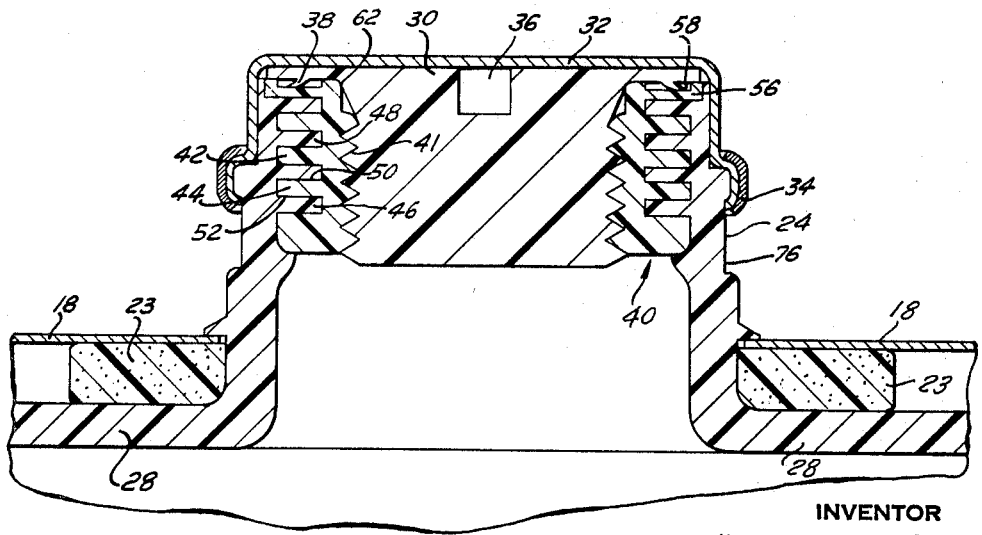
FIG. 3 is a side elevational sectional view along line 3—3 of FIG. 2.
Figure 7:
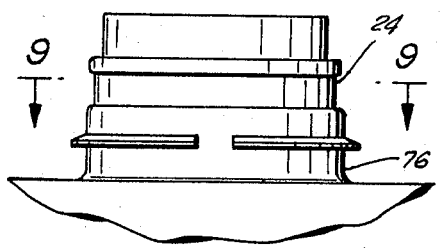
FIG. 7 is a fragmentary side elevational view similar to FIG. 6.
Figure 8:
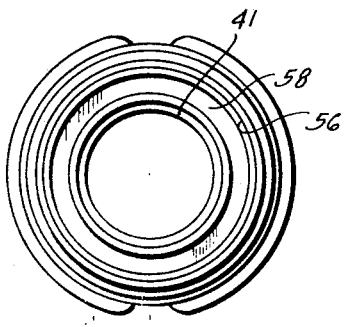
FIG. 8 is a top plan view of the neck of a drum body member.

Reference is now made to the drawings and to FIG. 1 in particular in which a drum 10 is shown comprising a tubular body member 12 including an outer body 14 and a blow-molded plastic liner 16 in surface-to-surface contact with the inner surfaces of the outer body 14.

It is to be appreciated that although this preferred embodiment is directed at a drum having a blow-molded plastic liner, the invention would apply equally to an all plastic, self-supporting, blow-molded container. The top 18 of the drum 10 is provided with suitable openings 20 and 22 through which pouring neck 24 and vent neck 26 protrude and a suitable gasket 23 is provided between the top of the liner 28 and the top of the drum 18. The construction of both the pouring neck 24 and the vent neck 26 are the same and the following description applies equally to both.

To enable the drum to be opened and resealed, the neck 24 includes a threaded portion which is adapted to receive a threaded closure 30. In this preferred embodiment, a dust cover 32 is depicted protecting the top of the closure 30. The dust cover 32 is secured in position by the retaining band 34. A slot 36 is provided in the closure 30 to accommodate a screwdriver or other tool to facilitate the engagement or removal of the threaded closure 30. The depicted closure 30 is of the standard type that relies on the compression of a flexible sealing member 38 to provide the desired sealing of the drum opening and is available commercially.

Because of the nature of blow molding procedures as ordinarily practiced today, it is not possible to blow-mold the threaded portion of the neck with sufficient precision to insure a liquid and airtight seal between the neck and closure. Thus, in accordance with the present invention, a precision threaded insert is disposed about the inner surfaces of the neck. The insert is in the form of a bushing and may be made from any convenient material by standard techniques. In one successful application of the present invention, injection molded polyethylene bushings were utilized.

Figure 10:
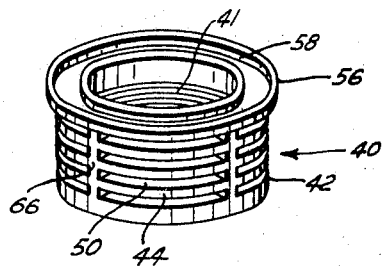
FIG. 10 is a perspective view of a threaded bushing used in accordance with the present invention.
Figure 11:
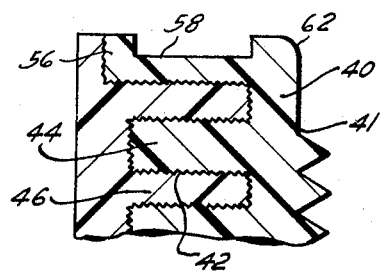
FIG. 11 is an enlarged fragmentary side elevational sectional view depicting in exaggerated form macroscopic grooving on the outer surfaces of the threaded bushing which cooperate in forming an effective seal between the drum, neck and bushing.

The bushing 40, as best seen in FIG. 10, comprises a substantially cylindrical member having threads disposed about its inner surface 41, and an outer surface 42 adapted to engage with portions of the neck in a sealing relationship. To effectuate this sealing erlationship, the outer surface 42 of the bushing 40 includes a multiplicity of spaced outwardly extending annular flanges 44 into which corresponding inwardly extending annular portions 46 on the neck protrude. The inwardly extending portions 46 engage the outer surface 42 of the bushing 40 as well as the top 50 and bottom 52 of the annular flanges 44 in surface-to-surface engagement. To increase the contact surface area between the neck 24 and bushing 40 and thereby increase the seal between the two, the outer surfaces 42 of the bushing may be macroscopically peened as shown in exaggerated form in FIG. 11.

A collar 56 is provided at the top of the bushing extending outwardly beyond the outer peripheral edge of the annular flanges 44. A circumferential recessed groove 58 is provided about the top of the collar 56 and serves to receive the flexible sealing member 38 of the closure 30. By recessing the surface at which the sealing member 38 of thec losure 30 contacts the bushing 40, the possibility of creating minute passageways through which the contents of the drum could leak out is minimized. To further aid in sealing the drum, the upper inner surface 62 of the collar is rounded so as to engage the closure 30 with a wedging action and thereby form a tight seal therebetween.

Figure 9:
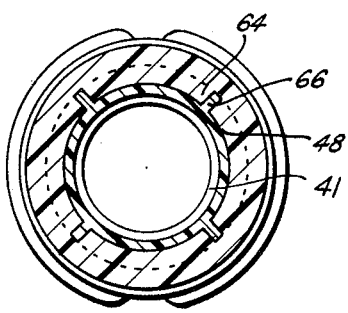
FIG. 9 is a sectional view along line 9—9 of FIG. 7.

In order to lock the bushing 40 into position with respect to the neck 24 and to prevent the bushing from rotating relative to the neck, the bushing is provided with a multiplicity of vertical ribs 66 which intersect the annular flanges 44. The ribs abut against sections 64 of the neck as shown in FIG. 9 and extend sufficiently into the neck to prevent rotation even when considerable torque is applied to the bushing such as when the last tightening turns are applied to the closure 30. Ribs 66 which are integral with the outer bushing surface 48 extend outwardly from the bushing and are surrounded on all sides by portions of the neck 24 as depicted in FIG. 9.

As is readily appreciated from the foregoing, it is preferred that the drum neck 24 include portions interposed between the vertical ribs 66 and annular flanges 44 of the bushing. In a successful application of the invention, the desired relationship between the bushing 40 and the neck 24 was obtained by forming the neck about the bushing during a standard blow molding operation by forcing portions of the semi-liquid blow molding parison into intimate contact with the bushing, coalescing with the bushing, and thereafter allowing the plastic to cure.

Thus, in accordance with standard blow molding procedures a parison of plastic material in a semi-liquid state is introduced between complimentary mold halves the inner surfaces of which define the shape of the drum that it is desired to form. The lower portion of such mold halves are depicted in FIGS. 4 and 5 and designated by numerals 72a and 72b and those surfaces defining the outer surfaces 76 of the neck 24 are designated 74a and 74b. Prior art molding techniques dicitate that at this point the mold halves be closed and compressed air be blown into the parison, thereby to blow-mold the desired container.

In accordance with the present invention, a bushing 40' of the type previously described is inserted between the mold halves 72a and 72b prior to the closing at a point corresponding to that where the neck is to be formed. The bushing 40' is threadedly mounted about a die 78 which is adapted to be supported within the mold halves at the desired position. In this regard, the inner surface 80 of the die is provided with a circular groove 82 disposed thereabout. A support rod 84, which in the embodiment depicted is the blow pin of the blow molding apparatus, is provided with a spring-loaded ball detent 86 which is conveniently adapted to engage the groove 80 of the die 78 so as to support the same at the desired position but which can readily be disengaged. The lower peripheral edge 88 of the die includes surfaces adapted to engage with corresponding surfaces on the mold halves to cleanly sever those portions of the parison 70 remaining outside the mold from those portions inside when the mold halves are closed as shown in FIG. 5.

In operation, a threaded die 78 is inserted within the threaded bushing 40' and the die and bushing are thereafter supported on the blow pin 84 which is disposed between the open complementary mold halves 72a and 72b, as depicted in exploded from in FIG. 4. A parison of heated plastic 70 in a semi-liquid state is then introduced into the mold halves about the blow pin 84 and the mold halves are closed to the position of FIG. 5. Closing the mold halves serves to force the plastic material to flow into intimate engagement with the outer surfaces of the bushing causing coalescence between the plastic and bushing and also serves to form the drum neck. In addition to supporting the bushing, the die 78 also serves to protect the precision inner thread of the bushing from coming in contact with any of the flowing plastic material when the mold halves are closed. The drum may then be blow-molded in accordance with standard techniques. After the plastic has sufficiently cured, the mold halves 72a and 72b are opened and the drum removed. The die may then be removed from the insert.

It should be understood that modifications may be made in the illustrated and described embodiments of my invention without departing from the invention as set forth in the accompanying claims.

I claim:

1. In a drum of the type comprising a body member having side walls with top and bottom members therein and a neck defining an opening into the drum interior extending outwardly from said body member, the improvement comprising a bushing disposed within said neck, said bushing having a threaded inner surface, an outer surface engaging the inner surface of said neck in a sealing relationship and rotation prevention means coupled to said bushing outer surface, said rotation prevention means including at least one member extending outwardly from the outer surface of said bushing adapted to abut against portions of said neck in intimate contact and thereby prevent relative rotation of said bushing with respect to said neck.

2. The drum in accordance with claim 1 wherein said body member comprises a blow-molded drum liner in surface-to-surface contact with a drum outer shell.

3. The invention in accordance with claim 1 comprising a blow-molded plastic drum.

4. The drum in accordance with claim 1 wherein said rotation prevention means includes a multiplicity of spaced outwardly extending annular flanges disposed about said outer surface and at least one rib intersecting said flanges, said rib extending outwardly from said outer surface substantially the same distance as the annular flanges and having surfaces thereon abutting portions of said neck.

5. The invention in accordance with claim 4, further comprising a multiplicity of intersecting ribs, said ribs perpendicularly intersecting the outwardly extending annular flanges.

6. The drum in accordance with claim 1 wherein said bushing outer surface defines a multiplicity of macroscopic grooves thereon, said grooves cooperating in forming the sealing relationship between the bushing and neck.

7. The invention in accordance with claim 1 wherein the upper inner peripheral edge of said bushing is rounded so as to engage surfaces of a closure with which the drum is to be associated for sealing said opening in a wedging relationship.

8. A bushing for use with a drum having a neck definign an opening into the drum interior comprising a substantially cylindrical member having a threaded inner surface and an outer surface including first means for coupling said bushing to said neck in a sealing relationship and second means for preventing the rotation of said bushing relative to said neck when said neck and bushing are in a sealing relationship rotation prevention means including at least one member extending outwardly from the outer usrface of said bushing adapted to abut portions of said neck in intimate contact and thereby preventing the rotation of said bushing relative to said neck.

9. The bushing in accordance with claim 8 wherein said outer surface defines a multiplicity of grooves and said grooves cooperate with complementary surfaces on said neck in forming said sealing relationship.

10. The bushing in accordance with claim 8 wherein said rotation prevention means comprises a multiplicity of spaced outwardly extending annular flanges disposed about said outer surface and at least one rib intersecting said flanges, said rib extending outwardly from the outer surface substantially the same distance as the annular flanges and having surfaces thereon abutting portions of said neck and thereby being prevented from being rotated relative to said neck.

11. The bushing in accordance with claim 8, further comprising a multiplicity of intersecting ribs, said ribs perpendicularly intersecting said flanges.

12. The invention in accordance with claim 8 comprising an injection molded plastic bushing.

References Cited

UNITED STATES PATENTS

| | | | |
|---|---|---|---|
| 3,167,210 | 1/1965 | Carney | 220—63 |
| 3,337,083 | 8/1967 | Godshalk | 220—63 |

GEORGE T. HALL, *Primary Examiner.*

U.S. Cl. X.R.

215—43; 220—39